United States Patent [19]

Coosemans et al.

[11] Patent Number: 4,914,168
[45] Date of Patent: Apr. 3, 1990

[54] CATALYST SYSTEM FOR (CO) POLYMERIZATION OF ETHYLENE IN SOLUTION

[75] Inventors: Luc M. C. Coosemans, Houthalen, Belgium; Frans J. P. G. Van Den Bosch, Schinnen, Netherlands

[73] Assignee: Stamicarbon B.V., Geleen, Netherlands

[21] Appl. No.: 226,863

[22] Filed: Aug. 1, 1988

Related U.S. Application Data

[62] Division of Ser. No. 154,370, Feb. 10, 1988, Pat. No. 4,826,794.

[30] Foreign Application Priority Data

Feb. 11, 1987 [NL] Netherlands ............... 8700322

[51] Int. Cl.$^4$ ............................................. C08F 4/64
[52] U.S. Cl. .................................... 526/127; 526/125; 526/133; 526/144; 526/153; 526/348.2; 526/352; 502/115
[58] Field of Search ............... 526/127, 153, 348.2, 526/352, 125, 133, 144

[56] References Cited

U.S. PATENT DOCUMENTS

| | | | |
|---|---|---|---|
| 4,172,050 | 10/1979 | Gessell | 526/151 |
| 4,409,126 | 10/1983 | Shipley et al. | 526/125 X |
| 4,496,661 | 1/1985 | Shipley | 526/119 X |
| 4,535,069 | 8/1985 | Shimizo et al. | 526/127 X |

FOREIGN PATENT DOCUMENTS

| | | |
|---|---|---|
| 0021753 | 1/1981 | European Pat. Off. . |
| 0057050 | 8/1982 | European Pat. Off. . |
| 0131420 | 1/1985 | European Pat. Off. . |
| 2700163 | 7/1977 | Fed. Rep. of Germany ...... 502/115 |
| 2388835 | 11/1978 | France . |
| 2059973 | 4/1981 | United Kingdom . |

OTHER PUBLICATIONS

European Search Report, Application No. 88200211.6.

Primary Examiner—Patrick P. Garvin
Attorney, Agent, or Firm—Cushman, Darby & Cushman

[57] ABSTRACT

Catalyst system, suitable for the (co)polymerization of ethylene and optionally minor amounts of 1-alkenes and/or dienes at such temperatures that the copolymer formed goes into solution, to be prepared by combining at least two components A and B, which components comprise:

A: one or more magnesium compounds, one or more aluminium compounds, one or more transition metal compounds and optionally one or more halogen compounds, in such amounts that the atomic ratio of halogen to magnesium is at least 2, the atomic ratio of aluminium to transition metal is at least 3, the atomic ratio of aluminium to magnesium is at least 1, and the atomic ratio of magnesium to transition metal is at least 0.5, B: one or more organoaluminium compounds of the general formula $R_m^1 Al X^1_{3-m}$, where the symbols $R^1$ are equal or different and represent a hydrocarbon residue with 1–20 carbon atoms and the symbols $X^1$ are equal or different and represent a hydrogen atom, a group of the general formula $-NR^2_2$ (where $R^2$ is a hydrocarbon residue with 1–10 carbon atoms), a group of the general formula $-OR^3$ (where $R^3$ is a hydrocarbon residue with 1–20 carbon atoms or a group of the general formula $-Si(R^4)_3$, where the symbols $R^4$ are equal or different and represent a hydrogen atom and/or a hydrocarbon residue with 1–20 carbon atoms), and $0 < m < 3$, or a group of the general formula $-[OAlR^5)]_n-OAlR_2^5$, where the symbols $R^5$ are equal or different and represent a hydrocarbon residue with 1–10 carbon atoms, and $n \geq 0$, which two components are, separately or in combination, supplied direct to the polymerization vessel in such amounts that the atomic ratio of the aluminium from components B to the aluminium from component A is at least 0.1.

2 Claims, No Drawings

CATALYST SYSTEM FOR (CO) POLYMERIZATION OF ETHYLENE IN SOLUTION

This is a division of application Ser. No. 154,370, filed Feb. 10, 1988, now U.S. Pat. No. 4,826,794.

The invention relates to a catalyst system for the (co)polymerization of ethylene and optionally minor amounts of 1-alkenes and/or dienes, to the preparation of this catalyst system and to the (co)polymerization of ethylene and optionally minor amounts of 1-alkenes and/or dienes.

There are numerous catalyst systems that are capable of bringing about polymerization of ethylene and/or 1-alkenes. Thus, for instance, so-called Phillips and Ziegler-Natta systems can be distinguished. Of these, a number relate to polymerization in the gas phase. Others are directed at polymerization in the presence of a liquid dispersant. The latter can be subdivided into the so-called suspension system, with polymerization taking place at temperatures below the dissolution temperature of polyethylene, and the so-called solution system, with a polymerization temperature above the dissolution temperature of the polyethylene formed.

Solution polymerization requires special catalyst systems as the molecular weight of the polymer produced generally decreases with increasing polymerization temperature. It was not until the end of the sixties that a catalyst was developed the activity of which was such as to allow of solution polymerization of ethylene without there being any need to remove catalyst residues from the product (GB-A 1,235,062).

At the time, these systems without washing treatment meant a major improvement of existing polymerization techniques. Since then, however, the requirements imposed on products have become much severer, not only qualitatively but especially as regards environmental and public health aspects. For this reason, a catalyst was needed that, while having a lower heavy metals content, produces, under comparable conditions, as much polyethylene of the same quality as the existing catalysts. In effect, this means a catalyst producing a higher amount of polyethylene per mmole of transition metal, which polyethylene must meet the customary requirements of processability and applicability.

The invention aims to find a catalyst system meeting the above-mentioned requirements.

It has, surprisingly, been found that a catalyst system that is a combination of at least two components, A and B, which components comprise:

A: on or more magnesium compounds, one or more aluminium compounds, one or more transition metal compounds and optionally one or more halogen compounds, in such amounts that the atomic ratio of halogen to magnesium is at least 2, the atomic ratio of aluminium to transition metal is at least 3, the atomic ratio of aluminium to magnesium is at least 1, and the atomic ratio of magnesium to transition metal is at least 0.5;

B: one or more organoaluminium compounds of the general formula $R_m^1AlX^1_{3-m}$, where the symbols $R^1$ are equal or different and represent a hydrocarbon residue with 1-20 carbon atoms and the symbols $X^1$ are equal or different and represent a hydrogen atom, a group of the general formula $-NR^2_2$ (where $R^2$ is a hydrocarbon residue with 1-10 carbon atoms), a group of the general formula $-OR^3$ (where $R^3$ is a hydrocarbon residue with 1-20 carbon atoms or a group of the general formula $-Si(R^4)_3$, where the symbols $R^4$ are equal or different and represent a hydrogen atom and/or a hydrocarbon residue with 1-20 carbon atoms), and $0<m<3$, or a group of the general formula $-[OAlR^5)]_n-OAlR_2^5$, where the symbols $R^5$ are equal or different and represent a hydrocarbon residue with 1-10 carbon atoms, and $n \geq 0$;

which components are fed, separately or in combination, direct to the polymerization vessel in such amounts that the atomic ratio of the aluminium from component B to the aluminium from component A is at least 0.1, has such an activity thet the amount of heavy metals that is present per gramme of polymer decreases substantially. At the same time, the polymer can normally be processed and applied.

From US-A 4,526,943 a two-component catalyst system is known. Component A contains a magnesium compound, which is pretreated with an organic hydroxyl compound. Also, component B comprises aluminium compounds other than those according to the subject invention. This system is intended for suspension polymerization and is less suitable for solution polymerization.

European patent applications EP-A 58594 and EP-A 132 299 describe catalyst systems that are active at solution polymerization temperatures.

EP-A 58594 comprises the combination of two components, the first of which is prepared by reacting a solid reaction product of an organomagnesium compound and a halide with a transition metal compound and an organometal compound and recovering the precipitate thus obtained, and the second of which is an organoaluminum compound. In EP-A 132 288 the first component is obtained by reacting a solid reaction product of an organomagnesium compound and a chlorosilane compound with an electron donor, recovering the precipitate thus obtained and reacting the same with a transition metal compound, and the second component is an organometallic compound.

A drawback of these catalysts is that the preparation of the first compound is a laborious affair. In plant-scale polymerizations, streamlining of the process is of prime importance; reactions that take some hours and the recovering of precipitates interfere with this aim. In addition, the precipitate gives rise to problems in dosing the catalyst to the polymerization vessel.

From US-A 4,330,647, likewise, a two-component catalyst is known that is suitable for polymerization under solution conditions. The first component here is prepared by reacting a reaction product of a magnesium compound and an (organic) trichloro- or tetrachlorocompound with a transition metal compound. Preparation of this compound also takes some hours. which is objectionable in a process to be carried out on plant scale. Here, too, the precipitate, which is not recovered separately, but is supplied to the reactor as a suspension, gives rise to problems in catalyst dosing and clogging of the feed line.

The catalysts according to the subject invention not only are very active, but also very rapid, so that very short residence times can be used. Short residence times have the great advantage that a small reactor can be used. Thus, in a 5 $m^3$ reactor an annual production of more than 50,000 t can be reached when using the catalysts according to the invention.

With the subject catalysts, residence times of 5 minutes or shorter will suffice. At residence times of 3 minutes the yields still are so high that no washing treatment for catalyst residue removal need be applied.

Yet another advantage is that components A and B are supplied direct to the reaction vessel, that is, without further heating, incubations, precipitate recovery and/or other treatments. This is of great importance in plant-scale polymerizations, where all efforts are aimed at streamlining of the process.

The residence time in the feed lines of the various ingredients of the catalyst components according to the invention generally is sufficient for obtaining an active catalyst system. In most cases this residence time will not be longer than some, for instance 5, minutes, and often even less, for instance less than 3 minuten or even less than 1 minute.

Catalyst systems according to the invention have the highest activity at an atomic ratio of aluminium from component A to transition metal of at least 5. Furthermore, it is recommendable for the atomic ratio of aluminium from component A to magnesium to be higher than 2, in particular at least 3. An atomic ratio of halogen to magnesium of at least 3, in particular at least 5, leads to improvement of the results. The above-mentioned ratios will generally be at most 500, in particular at most 200, and more in particular at most 100. A further activity increase is achieved at an atomic ratio of magnesium to transition metal of at least 1, in particular at least 1.5, more in particular at least 2, especially when the transition metal compound is formed by one or more titanium compounds. This ratio will usually not be higher than 100, in particular 50.

The atomic ratio of aluminium from component B to aluminium from component A that gives the best results depends somewhat on the composition and amounts of the other catalyst components. In general, a ratio of at least 0.2 and at most 10, in particular at most 5 and more in particular at most 2, is to be recommended.

The transition metal compounds of component A preferably contain at least a titanium compound, good results being obtained especially with titanium compounds of the general formula $Ti(OR^6)_{4-p}X^2_p$ or $Ti(OR^7)_{3-q}X^3$, where the symbols $R^6$ and $R^7$ are equal or different and represent hydrocarbon residues with 1–20 carbon atoms, $X^2$ and $X^3$ represent halogen atoms, $0 \leq p \leq 4$ and $0 \leq q \leq 3$.

Of these compounds, titanic acid esters, such as tetrabutoxytitanium, are recommended. Besides the titanium compound, optionally other transition metal compounds may be present, for instance compounds of vanadium, molybdenum, zirconium and/or chromium. It is also possible to apply titanium complexes such as, for instance, $TiCl_3.3$ decanol, tetrabutoxytitanium.$AlCl_3$, tetrabutoxytitanium.$0.2Cr$ (acetylacetonate), tetrabutoxytitanium.$xCrO_3$ and tetrabutoxytitanium.$x$diethylzinc ($0 < x \leq 1$). Compounds such as cresyl titanate polymer $(CH_3C_6H_4[Ti(OC_6H_4CH_3)_2O]_aOC_6H_4CH_3$, $a \geq 1)$, for instance, can likewise be applied. Mixtures of titanium compounds and/or other transition metal compounds can also be used.

The magnesium compounds of component A preferably have the general formule $R^8_rMgX^4_{2-r}$, where $R^8$ represents a hydrocarbon residue with 1–20 carbon atoms, in particular alkyl, and $X^4$ a halogen atom, in particular chloride, or an alkoxy-group, with $0 \leq r \leq 2$.

It is in particular recommendable for the magnesium compound to be soluble in the solvents customarily used in solution polymerization systems, or to be prepared starting from a soluble magnesium compound.

Preference is given to organomagnesium compounds, especially those with at least one hydrocarbon residue bound to the magnesium atom, preferably an alkyl residue. In particular dialkylmagnesium compounds yield a catalyst system with a high activity. The (organo)magnesium compound may also be complexed with other (organo)metal compounds so as to obtain a soluble product. For this purpose, for instance organozinc, organoborium, organolithium, but especially organoaluminium compounds are suitable. Examples of magnesium compounds that are suitable for component A are ethylbutylmagensium, dibutylmagnesium, and higher dialkylmagnesium compounds, as well as complexes of, for instance, dibutylmagnesium.⅓triethylaluminium and the like, or mixtures thereof.

The aluminium compound of component A may be chosen from a large group of compounds. Preference is given to an organoaluminium compound of the general formula $R^9_sAlX^5_{3-s}$, where the symbols $R^9$ are equal or different and represent a hydrocarbon residue with 1–20 carbon atoms, in particular alkyl, $X^5$ represents a halogen atom, in particular chlorine, and $0 < s \leq 3$. Mixtures may also be applied.

Examples of organoaluminium compounds of component A are: diethylaluminium chloride, monoethylaluminium chloride, monomethylaluminium dichloride, sesquimethylaluminium chloride ($ethyl_{1.5}AlCl_{1.5}$), sesquimethylaluminium chloride ($methyl_{1.5}AlCl_{1.5}$). Particularly diethylaluminium chloride and/or sesquiethylaluminium chloride yield good results. Aluminium compounds in which no halogen is present (like diethylaluminium dihydromethylsiloxide, diethylaluminium dimethylethylsiloxide, diethylaluminium triphenylsiloxide, triethylaluminium, triisobutylaluminium, trimethylaluminium) can also be used but in that case a halogen, in particular chlorine, containing compound is preferably added. These can be hydrogen chloride, alkyl chlorides, acyl chlorides, aryl chlorides, inorganic chlorides or combinations thereof.

A point to be observed is that the atomic ratio of halogen to magnesium must at least be 2. If use is made of aluminium compounds containing little halogen, in particular trialkylaluminium compounds, it may be necessary to increase the halogen content of component A. This may be done by, for instance, choosing the transition metal compound such that it can serve as halogen source. However, in connection with the freedom of choice in this respect it is to be recommended to add an additional halogen compound. For this purpose for instance alkyl chlorides can be used, or acyl chlorides, aryl chlorides, inorganic chlorides or combinations thereof. In the case of organic chlorides, monochloro- and dichloro-compounds are preferred, in particular monochloro-compounds. Preference is given to isopropyl chloride, benzyl chloride and/or chlorides of elements from groups 3a and 4a of the Periodic System (Handbook of Chemistry and Physics, 52nd ed.), in particular $SiCl_4$ and $BCl_3$. Also mixtures can be applied.

An active catalyst yielding a high polymer molecular weight, also at low transition metal contents, is formed also when component A furthermore comprises one or more electron donors (Lewis bases), such as, for instance, diethylamine, ethyl benzoate, isopropyl alcohol, acetyl acetone and/or methylparatoluate.

This electron donor may also be added together with one of the other compounds, for instance in the form of tetrabutoxytitanium or tetraisopropoxytitanium, or premixed with the magnesium compound. It also is possible to add an extra amount of electron donor, besides for instance tetrabutoxytitanium.

The aluminium compound of component B preferably possesses oxygen bonded to aluminium, in particular alkyl aluminoxane $(R^5{}_2Al-[OAl(R^5)]_n-OAlR^5{}_2$, where $R^5$ is equal or different and a hydrocarbon residue with 1-10 carbon atoms and n J O), alkylsiloxalane or dialkylaluminium alkoxide.

Examples of organoaluminium compounds of component B are: methylaluminoxane, diethylaluminium dihydroxymethylsiloxide, diethylaluminium dimethylethylsiloxide, diethylaluminium triphenylsiloxide, triisobutylaluminoxane, diethylaluminium methoxide. Mixtures may also yield good results.

A further increase in activity is achieved if, besides the organoaluminum compound(s), one or more other metal alkyls are added to component B, such as, for instance, compounds of dialkylmagnesium, dialkylzinc, trialkylborium and alkyllithium. Good results are obtained particularly when component B also comprises one or more electron donors, such as ethyl benzoate, isopropyl alcohol, methylparatoluate, decanol, polymethylhydrosiloxane.

If desired, also a chloride may be added to component B.

The components of catalyst systems according to the invention may be fed to the reactor separately or in combination. However, a better result is obtained when components A and B are fed separately to the reactor. When components A and B are fed separately to the reactor, it is in itself immaterial in what sequence this is done.

As regards the mixing of the ingredients of component A, it is recommended, notably for plant-scale polymerizations, to mix first the magnesium compound with the aluminium compound and the optional halogen compound before contacting them with the transition metal compound(s), since this contributes to streamlining of the plant process. It is recommendable for mixing of the magnesium compound with the aluminium compound and the optional halogen compound to be effected at a temperature below 100° C., in particular below 75° C., more in particular below 50° C. In general the temperature will not be below −60° C.

As regards component B, the mixing sequence, if any, of the ingredients can freely be determined, without this giving rise to a significant decline in catalyst activity.

The absence or presence of monomer(s) during mixing of the catalyst ingredients has little effect on catalyst activity, and this holds for both component A and component B.

It also is possible to supply a third catalyst component, besides components A and B, to the reactor. This third component may be an (organo)aluminium compound, a chloride and/or an electron donor, in particular a chloride or aryl or alkyl or of an element from groups 3a and 4a of the Periodic System, or an organoaluminium chloride. This third component may be fed direct to the reactor, or for instance to the monomer feed.

The invention also relates to polymers obtained by means of a catalyst according to the invention. These polymers comprise ethylene, one or more 1-alkenes with 3 to 18 carbon atoms in an amount of 0 to 15 moles % relative to the total polymer, and one or more dienes with at least 7 carbon atoms in an amount of 0 to 10 moles % relative to the total polymer. In particular polymers in which the dienes contain at least two non-conjugated double bonds capable of being polymerized by means of transition metal catalysts, and in which the amount of dienes does not exceed 0.1 moles % relative to the total polymer, have good properties.

Polymers according to the invention may contain the customary additives, such as stabilizers, lubricants, etc., and also, for instance, crosslinking agents and fillers.

Polymers obtained by means of a catalyst according to the invention possess the customary properties that are commercially desired, such as sufficiently high molecular weight (low melt index) and good processability. They can be used for the preparation of cast film and blown film having good mechanical and optical properties, while also the rheological and welding properties meet the normal requirements. The polymers are also suitable for many other customary applications, e.g. injection moulding and rotational moulding.

Polymerization can be effected in a manner known in itself, both batchwise and continuously. In general the catalyst components are added in such amounts that the amount of titanium in the polymerization medium is 0.0001 to 4 mmole/l, preferably 0.0005 to 0.5 mmole/l and more in particular 0.001 to 0.05 mmole/l.

As dispersing agent, both in the catalyst preparation and in the polymerization, use can be made of any liquid that is inert relative to the catalyst system, for instance one or more saturated, straight or branched aliphatic hydrocarbons, such as butanes, pentanes, hexanes, heptanes, pentamethylheptane or petroleum fractions such as light or regular-grade petrol, isopar, naphta, kerosine, gas oil. Aromatic hydrocarbons, for instance benzene or toluene, can be used, but both because of the cost price and for safety considerations such solvents will generally not be applied in technical scale production. By preference, therefore, in technical-scale polymerizations as solvent use is made of the cheap aliphatic hydrocarbons or mixtures thereof, as marketed by the petrochemical industry. Pretreatment of such solvents, for instance drying or purification, is often required. This will present no problems whatsoever to the average person skilled in the art. Cyclic hydrocarbons, such as cyclohexane and decalin, can of course also be used as solvent.

By preference the polymerization is effected at temperatures above 110° C., especially above 135° C., and more in particular at temperatures above 150° C. For practical considerations the temperature will generally not be higher than 300° C.

The polymer solution obtained upon polymerization can subsequently be recovered in a way known in itself, the catalyst generally being deactivated at some stage of the recovery. Deactivation can be effected in a way known in itself. The catalysts according to the present invention are so active that the amount of catalyst in the polymer, notably the transition metal content, is so low that removal of catalyst residues can be done without. Of course the polymer can be subjected to a washing treatment so as to further reduce the residual content of catalyst components, if this is desired.

Polymerization can be effected under atmospheric pressure, but also at elevated pressure, up to about 1000 bar, or even higher, both in continuous and in discontinuous manner. By effecting the polymerization under pressure, the polymer yield can be increased further, which may contribute to the preparation of a polymer having a very low content of catalyst residues. It is preferred to polymerize at pressures of 1-200 bar, and more in particular of 10-100 bar.

Pressures in excess of 100 bar soon give rise to technological objections. Much higher pressures, of 1000 bar and more, can however be used if polymerization is effected in so-called high-pressure reactors.

In the subject process modifications known in itself can be applied. Thus, for instance, the molecular weight can be controlled by addition of hydrogen or other customary modifying agents. Polymerization can also be effected in various stages, connected either in parallel or in series, in which, if desired, differing catalyst compositions, temperatures, residence times, pressures, hydrogen concentrations, etc. are applied. Products with a broad molecular weight distribution, for instance, can be prepared by selecting the conditions in one stage, for instance pressure, temperature and hydrogen concentration, such that a polymer with a high molecular weight is formed, while the conditions in another stage are selected such that a polymer with a lower molecular weight is formed.

The invention will now be elucidated with reference to some examples, without, however, being restricted thereto.

In a double-walled, 2-liter autoclave a number of continuous polymerizations were carried out. To this end, the autoclave was filled entirely with gasoline, which had been purified using molecular sieves. In an absorber, ethylene and, if desired, hydrogen were dissolved in purified gasoline. Copolymerizaations were effected by supplying octene-1 to the gasoline stream containing ethylene and optionally hydrogen. The reactor temperature was set at 185° C. using the jacket heating of the autoclave, and it was kept at the desired value during the polymerization, if necessary with cooling being applied. The pressure in the reactor was set so that the reactor remained entirely filled with liquid.

The ingredients of the catalyst components were premixed during the residence time in the feed lines, before the components were pumped separately into the reactor. The residence time was about 5 minutes. The polymer was recovered, if necessary stabilized, dried and weighed. The activity a of the catalyst system is expressed as g PE per min. mole ethylene/l. The melt index (M.I.), expressed in dg/min, was determined according to ASTM D 1238, cond. E. The melt flow ratio (MFR) was calculated as the quotient of the melt index according to ASTM D 1238, cond. F, and the melt index according to ASTM D 1238, cond. E. The density (d), expressed in kg/m$^3$, was measured according to ASTM D 1505.

EXAMPLE I AND COMPARATIVE EXAMPLE 1

Ethylene and hydrogen were dosed to the reactor in amounts of 1325 g/hr and 9 mg/hr, respectively, and 1-octene in an amount of 760 g/hr. The gasoline flow rate was 8.3 l/hr. Isopropyl chloride was dosed to the gasoline feed in an amount of 0.10 mmole/l. Component A was prepared by successively dosing sesquiethylaluminium (SEAC, $Et_{1.5}AlCl_{1.5}$), ethylbutylmagnesium (EBM) and tetrabutoxytitanium (TBT) to a separate reactor feed line, in the amounts shown in Table 1. In addition, through the gasoline feed line diethylaluminium alkoxide (DEALOX) was dosed as component B. The effect of the presence of component B triethylaluminium (TEA) is visualized in Table 1 (exp. no. 1–3). For comparison exp. no. 4–6 were also carried out.

TABLE 1

| exp. no. | component A SEAC mmole/l | component A EBM mmole/l | component A TBT mmole/l | component B DEALOX mmole/l | a | M.I. | M.F.R. | d |
|---|---|---|---|---|---|---|---|---|
| 1 | 0.30 | 0.06 | 0.03 | 0.10 | 833 | | | |
| 2 | 0.25 | 0.05 | 0.03 | 0.20 | 685 | 1.3 | 31.5 | 925 |
| 3 | 0.25 | 0.05 | 0.03 | 0.30 | 596 | 0.9 | 32.6 | |
| 4 | 0.10 | 0.12 | 0.03 | 0.10 | < 50 | | | |
| 5 | 0.05 | 0.06 | 0.03 | 0.10 | < 50 | | | |
| 6 | TEA 0.30 | 0.06 | 0.03 | 0.10 | < 50 | | | |

COMPARATIVE EXAMPLE 2

In a final volume of 50 ml pentamethylheptane (PMH) 0,6 mmole/l of an ethylbutylmagnesium (EBM) solution were added to a solution of 30 mmole/l of sesquiethylaluminium (SEAC) and stirred at 70° C. for two hours. Then tetrabutoxytitanium was added to a final concentration of 0.3 mmole/l and stirring was continued at 120° C. for two hours.

The resulting precipitate was a brownish-black cake which could not be used for polymerization.

COMPARATIVE EXAMPLE 3

Example I was repeated, but now in the absence of component B.

The results is presented in Table 2 (exp. Nos. 1, 2 and 3).

COMPARATIVE EXAMPLE 4

Example I was repeated, but now with sesquiethylaluminium-chloride (SEAC) as component B (Table 2, exp. No. 4).

COMPARATIVE EXAMPLE 5

Example I was repeated, but this time with triethylaluminium (TEA) as component B (Table 2, exp. Nos. 5, 6 and 7).

TABLE 2

| exp. no. | component A SEAC mmole/l | component A EBM mmole/l | component A TBT mmole/l | component B mmole/l | a | M.I. | M.F.R. | d |
|---|---|---|---|---|---|---|---|---|
| 1 | 0.40 | 0.08 | 0.03 | 0 | 603 | 1.7 | 27.3 | 918 |
| 2 | 0.30 | 0.06 | 0.03 | 0 | 582 | | | |
| 3 | 0.33 | 0.06 | 0.03 | 0 | 582 | | | |
| 4 | 0.40 | 0.06 | 0.03 | SEAC 0.10 | 275 | | | |
| 5 | 0.33 | 0.06 | 0.03 | TEA 0.10 | 603 | 1.2 | 30.5 | 921 |
| 6 | 0.33 | 0.06 | 0.03 | 0.20 | 569 | 1.5 | 33.7 | 925 |
| 7 | 0.33 | 0.06 | 0.03 | 0.30 | 271 | 0.7 | 35.7 | |

EXAMPLE II AND COMPARATIVE EXAMPLE 6

1975 g/hr ethylene, 16 mg/hr hydrogen, 1100 g/hr 1-octene and 12.2 l/hr gasoline were supplied to the reactor. The ethylene flow was provided with 0.10 mmole/l isopropyl chloride. Table 3, in which exp. No. 1 has been included for the sake of comparison, shows the effect of the presence of increasing amounts of component B at a low TBT content.

TABLE 3

| exp. no. | component A SEAC mmole/l | EBM | TBT | component B DEALOX mmole/l | M. a | M.I. | F.R. | d |
|---|---|---|---|---|---|---|---|---|
| 1 | 0.40 | 0.10 | 0.01 | 0 | 700 | | | |
| 2 | 0.40 | 0.10 | 0.01 | 0.05 | 983 | 3.6 | 29.5 | 922 |
| 3 | 0.40 | 0.10 | 0.01 | 0.10 | 983 | 4.1 | 31.3 | |
| 4 | 0.40 | 0.10 | 0.01 | 0.15 | 983 | 4.3 | 31.2 | |
| 5 | 0.40 | 0.10 | 0.01 | 0.20 | 1170 | | | |
| 6 | 0.40 | 0.10 | 0.01 | 0.25 | 1069 | 5.0 | 30.7 | |
| 7 | 0.40 | 0.10 | 0.01 | 0.30 | 1053 | 5.1 | 32.3 | |

COMPARATIVE EXAMPLE 7

Example II was repeated, now in the absence of component B.

TABLE 4

| exp. no. | component A SEAC mmole/l | EBM | TBT | component B | a | M.I. | M.F.R. | d |
|---|---|---|---|---|---|---|---|---|
| 1 | 0.30 | 0.10 | 0.008 | 0 | (0) | | | |
| 2 | 0.30 | 0.10 | 0.010 | 0 | 786 | | | |
| 3 | 0.28 | 0.06 | 0.015 | 0 | 933 | | | |
| 4 | 0.28 | 0.06 | 0.020 | 0 | 1020 | | | |
| 5 | 0.28 | 0.06 | 0.025 | 0 | 1265 | 2.8 | 29.8 | |

EXAMPLE III

This example illustrates the effect of the presence of component B on the activity increase brought about by an increasing TBT content under polymerization conditions as in Example II. From this example, compared with comparative example 7, it is apparent that the amount of transition metal compound required for achieving a certain activity has decreased considerably.

It is also clear that a subtantial increase in activity is achieved at the same amount of transition metal.

TABLE 5

| exp. no. | component A SEAC mmole/l | EBM | TBT | component B DEALOX mmole/l | M. a | M.I. | F.R. | d |
|---|---|---|---|---|---|---|---|---|
| 1 | 0.40 | 0.10 | 0.010 | 0.10 | 983 | 3.6 | 29.5 | |
| 2 | 0.28 | 0.06 | 0.015 | 0.10 | 1229 | 2.9 | 28.9 | |
| 3 | 0.28 | 0.06 | 0.020 | 0.10 | 1391 | | | |
| 4 | 0.35 | 0.08 | 0.020 | 0.10 | 1403 | 3.8 | 32.1 | |
| 5 | 0.35 | 0.08 | 0.025 | 0.10 | 1798 | | | |
| 6 | 0.35 | 0.08 | 0.030 | 0.10 | 1940 | 3.7 | 34.2 | |
| 7 | 0.32 | 0.08 | 0.008 | 0.20 | 982 | 4.9 | 29.8 | |
| 8 | 0.28 | 0.06 | 0.010 | 0.20 | 1166 | 3.3 | 30.3 | |
| 9 | 0.28 | 0.06 | 0.015 | 0.20 | 1224 | 3.6 | 30.5 | 920 |
| 10 | 0.28 | 0.06 | 0.020 | 0.20 | 1357 | | | |
| 11 | 0.28 | 0.06 | 0.025 | 0.20 | 1520 | | | |
| 12 | 0.30 | 0.06 | 0.030 | 0.20 | 1660 | | | |
| 13 | 0.40 | 0.10 | 0.010 | 0.30 | 1053 | 5.1 | 32.3 | |
| 14 | 0.28 | 0.06 | 0.015 | 0.30 | 1152 | | | |
| 15 | 0.28 | 0.06 | 0.020 | 0.30 | 1317 | 3.0 | 31.3 | |

EXAMPLE IV AND COMPARATIVE EXAMPLE 8

1325 g/hr ethylene, 760 g/hr 1-octene, 9 mg/hr hydrogen and 8.3 l/hr gasoline were supplied to the reactor. The ethylene feed was provided with 0.10 mmol/l isopropyl chloride. As transition metal compound use was made of a mixture. Table 6. Exp. No. 1 is included for the sake of comparison.

TABLE 6

| exp. no. | component A SEAC mmole/l | EBM | TBT TiCl₄ | component B DEALOX mmole/l | M. a | M.I. | F.R. | d |
|---|---|---|---|---|---|---|---|---|
| 1 | 0.19 | 0.07 | 0.03 / 0.01 | 0 | 761 | 1.5 | 31.1 | 924 |
| 2 | 0.19 | 0.07 | 0.03 / 0.01 | 0.20 | 1196 | | | |
| 3 | 0.19 | 0.05 | 0.03 / 0.01 | 0.20 | 985 | 1.2 | 34.9 | |
| 4 | 0.19 | 0.05 | 0.03 / 0.01 | 0.30 | 852 | 1.0 | 35.4 | 926 |

EXAMPLE V AND COMPARATIVE EXAMPLE 9

The reactor was supplied with 1731 g/hr ethylene, 2000 g/hr 1-octene, 54 mg/hr hydrogen and 9.4 l/hr gasoline, and the ethylene flow with 0.10 mmole/l isopropyl chloride. As component B use was made of diethylaluminium dimethylethylsiloxide (DADS). Table 7. Exp. No. 1 is included for comparative purposes.

TABLE 7

| exp. no. | component A SEAC mmole/l | EBM | TBT | component B DADS mmole/l | M. a | M.I. | F.R. | d |
|---|---|---|---|---|---|---|---|---|
| 1 | 0.30 | 0.09 | 0.04 | 0 | 1141 | | | |
| 2 | 0.30 | 0.09 | 0.04 | 0.10 | 1530 | 3.4 | 35.4 | 906 |
| 3 | 0.30 | 0.09 | 0.04 | 0.20 | 1923 | | | |
| 4 | 0.30 | 0.09 | 0.04 | 0.30 | 2040 | | | |

We claim:

1. Process for the (co)polymerization of ethylene and optionally minor amounts of 1-alkenes and/or dienes, comprising the following steps:

polymerizing ethylene and optionally minor amounts of 1-alkenes and/or dienes at a temperature above 110° C. employing a catalyst, said catalyst prepared by combining at least two components A and B said components including, A: One or more magnesium compounds, one or more aluminum compounds, one or more transition metal compounds and optionally one or more halogen compounds, in such amounts that the atomic ratio of halogen to magnesium is at least 2, the atomic ratio of aluminum to transition metal is at least 3, the atomic ratio of aluminum to magnesium is at least 1, and the atomic ratio of magnesium to transition metal is at least 0.5, wherein the transition metal compound(s) is/are one or more titanium compound(s) of the general formula Ti-$(OR^6)_{4-p}X^2_p$ and/or $Ti(OR^7)_{3-q}X^3_q$, where the symbols $R^1$ and $R^2$ are equal or different and represent hydrocarbon radicals with 1-20 carbon atoms, $X^2$ and $X^3$ halogen atoms, $0 \leq p \leq 4$ and $0 \leq q \leq 3$, the magnesium compound(s) belong(s) to the compounds of the general formula $R^8_r MgX^4_{2-r}$, where $R^8$ represents a hydrocarbon radical with 1-20 carbon atoms and $X^4$ a halogen atom or an alkoxy group, and $0 \leq r \leq 2$, the aluminum compound(s) belong(s) to the compounds of the general formula $R^9_s AlX^5_{3-s}$, where the symbols $R^9$ are equal or different and represent a hydrocarbon radical with 1-20 carbon atoms, $X^5$ represents a halogen atom and $0 \leq s \leq 3$, and the optional halogen compound(s) belong(s) to the group of chlorides, of alkyl, acyl, aryl, and/or chlorides of elements from groups 3a and 4a of the Periodic System, B: one or more organoaluminum compounds of the general formula $R_m^1AlX^1_{3-m}$, where the symbols $R^1$ are equal or different and represent a hydrocarbon radical with 1-20 carbon atoms and the symbols $X^1$ are equal or different and represent a hydrogen atom, a group of the general formula $-NR^2_2$ (where $R^2$ is a hydrocarbon radical with 1-10 carbon atoms), a group of the general formula $-OR^3$ (where $R^3$ is a hydrocarbon radical with 1-20 carbon atoms or a group of the general formula $-Si(R^4)_3$, where the symbols $R^4$ are equal or different and represent a hydrogen and/or a hydrocarbon radical with 1-20 carbon atoms), and 021 $m<3$, or a group of the general formula $-(OAlR^5))_n-OAlR^5_2$, where the symbols $R^5$ are equal or different and represent a hydrocarbon radical with 1-10 carbon atoms, and $\geq 0$, which two components are, separately or in combination, supplied direct to the polymerization vessel in such amounts that the atomic ratio of the aluminum from component B to the aluminum from component A is at least 0.1.

2. Process according to claim 1, characterized in that polymerization is effected at a temperature above 135° C.

* * * * *

UNITED STATES PATENT AND TRADEMARK OFFICE
CERTIFICATE OF CORRECTION

PATENT NO. : 4,914,168
DATED : April 3, 1990
INVENTOR(S) : COOSEMANS et al

It is certified that error appears in the above-identified patent and that said Letters Patent is hereby corrected as shown below:

In the Abstract   [57]

line 36, change "components B" to -- component B --.

Column 2, line 14, change "thet" to -- that --,
          line 56, change "hours." to -- hours, --.

Column 3, line 13, change "is.sufficient" to -- is sufficient --.

UNITED STATES PATENT AND TRADEMARK OFFICE
CERTIFICATE OF CORRECTION

PATENT NO. : 4,914,168
DATED : April 3, 1990
INVENTOR(S) : Coosemans, et al.

It is certified that error appears in the above-identified patent and that said Letters Patent is hereby corrected as shown below:

Column 7, line 25, change "liter" to -- litre --,
line 30, change "Copolymerizaations" to -- copolymerizations --.

UNITED STATES PATENT AND TRADEMARK OFFICE
CERTIFICATE OF CORRECTION

PATENT NO. : 4,914,168
DATED : April 3, 1990
INVENTOR(S) : Coosemans, et al.

It is certified that error appears in the above-identified patent and that said Letters Patent is hereby corrected as shown below:

Column 10, line 68, change "$0 \leq s \leq 3$" to -- $0 < s \leq 3$ --.

Column 12, line 1, change "021" to -- $0 <$ --.

Signed and Sealed this

Thirteenth Day of October, 1992

Attest:

DOUGLAS B. COMER

Attesting Officer

Acting Commissioner of Patents and Trademarks